(12) United States Patent
Roberts et al.

(10) Patent No.: US 7,965,868 B2
(45) Date of Patent: Jun. 21, 2011

(54) SYSTEM AND METHOD FOR BULLET TRACKING AND SHOOTER LOCALIZATION

(75) Inventors: Randy S. Roberts, Livermore, CA (US); Eric F. Breitfeller, Dublin, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1004 days.

(21) Appl. No.: 11/880,180

(22) Filed: Jul. 20, 2007

(65) Prior Publication Data

US 2010/0027840 A1 Feb. 4, 2010

Related U.S. Application Data

(60) Provisional application No. 60/832,344, filed on Jul. 20, 2006.

(51) Int. Cl.
*G06K 9/00* (2006.01)
*G06K 9/40* (2006.01)
(52) U.S. Cl. .................. 382/103; 382/260; 382/261
(58) Field of Classification Search .................. 382/100, 382/103, 107–108, 112, 131–147, 150–164, 382/173–180, 218, 232–233, 239, 249, 254, 382/260–261, 265, 275, 300, 319; 356/28.5, 356/237.5, 450, 480, 484, 600, 612, 152, 356/5.01; 250/252.1, 559.34, 559.36, 559.4; 375/240.18, 350; 348/94, 125–126; 345/173–174, 345/179–181; 178/18–19; 244/3.16, 3.15, 244/3.1; 463/1–5; 273/317.9, 329–330, 317.1–317.7; 705/26; 600/331; 715/209–210; 378/18, 207; 342/62, 76, 95, 357; 367/118, 124, 127, 906; 235/411–412; 473/131–415
See application file for complete search history.

(56) References Cited

U.S. PATENT DOCUMENTS

| | | | |
|---|---|---|---|
| 5,596,509 A | 1/1997 | Karr | |
| 5,781,505 A | 7/1998 | Rowland | |
| 5,796,474 A | 8/1998 | Squire et al. | |
| 5,912,862 A | 6/1999 | Gustavsen et al. | |
| 5,930,202 A | 7/1999 | Duckworth et al. | |
| 7,544,137 B2 * | 6/2009 | Richardson | 473/415 |
| 2007/0040062 A1 * | 2/2007 | Lau et al. | 244/3.16 |

* cited by examiner

*Primary Examiner* — Samir A Ahmed
*Assistant Examiner* — Mehdi Rashidian
(74) *Attorney, Agent, or Firm* — James S. Tak

(57) ABSTRACT

A system and method of processing infrared imagery to determine projectile trajectories and the locations of shooters with a high degree of accuracy. The method includes image processing infrared image data to reduce noise and identify streak-shaped image features, using a Kalman filter to estimate optimal projectile trajectories, updating the Kalman filter with new image data, determining projectile source locations by solving a combinatorial least-squares solution for all optimal projectile trajectories, and displaying all of the projectile source locations. Such a shooter-localization system is of great interest for military and law enforcement applications to determine sniper locations, especially in urban combat scenarios.

30 Claims, 7 Drawing Sheets

US 7,965,868 B2

SYSTEM AND METHOD FOR BULLET TRACKING AND SHOOTER LOCALIZATION

I. REFERENCE TO PRIOR APPLICATIONS

This application claims priority in provisional application filed on Jul. 20, 2006, entitled "Algorithms for Bullet Tracking and Shooter Localization" Ser. No. 60/832,344, by Rand Roberts et al, and incorporated by reference herein.

II. FEDERALLY SPONSORED RESEARCH OR DEVELOPMENT

The United States Government has rights in this invention pursuant to Contract No. W-7405-ENG-48 between the United States Department of Energy and the University of California for the operation of Lawrence Livermore National Laboratory.

III. BACKGROUND OF THE INVENTION

A. Technical Field

The present invention relates to projectile detection, tracking, and source localization, and more particularly to a passive system and method of infrared detection, tracking, and source localization of multiple projectiles (such as for example, bullets, rocket propelled grenades (RPG), and mortars) shot simultaneously in optically cluttered environments.

B. Description of the Related Art

Various systems and methods are known for estimating the trajectory of a projectile, such as a bullet or other supersonic projectile, and for determining sniper positions. Some such systems employ acoustic methods to determine projectile trajectory and source location from the acoustic signature of the shock wave generated by the projectile, i.e. from the acoustic muzzle blast generated when the projectile is fired. Representative examples include U.S. Pat. Nos. 5,241,518; 5,912,862; and 5,930,202. However, complex environments, such as battlefield and urban settings, and noise suppression techniques, often make detection of the muzzle blast unreliable and in some cases near impossible. Other types of shooter localization systems commonly known in the art employ optical methods based on infrared technology. However, these detection systems often rely on the visual observation of muzzle flash, and as such are easily defeated by concealing muzzle flash, such as for example by using a silencer, pillow, etc., or in situations where the shooter is behind a wall or other obstruction. Moreover, these systems based on muzzle flash detection cannot determine the trajectory of the bullet, and are susceptible to optical clutter from complex environments.

In U.S. Pat. No. 5,596,509 a passive bullet detection and tracking method is disclosed that does not rely on muzzle flash detection, but rather uses infrared radiation (IR) detection to detect and track the hot projectile trajectories. IR detection has the advantage that is passive. That is, IR detection devices do not emit radiation, unlike active such as for example disclosed in U.S. Pat. No. 5,796,474 which radiate energy to determine projectile trajectory from range data. Instead, passive IR based systems detect heat or infrared radiation emitted from an object. Thus, because an IR detector does not emit radiation, an object being detected and tracked using an IR detector can not easily determine the source or location of the IR detector.

It is important for bullet detection, tracking and source locating systems to operate with the camera/detector/sensor pointing perpendicular to the bullet's trajectory, i.e. a vantage point of an observer, not a party to the shooting. This enables applications such as: reconnaissance by a UAV over an urban combat zone, or surreptitious surveillance of a firelight. It also allows the range of detection, tracking, and localization to be extended to at least 400 meters.

A need exists for a passive system and method for tracking multiple projectiles simultaneously and locating multiple sniper positions from a vantage point that is substantially orthogonal to the projectile trajectories. Such shooter-localization systems are of great interest to for military application for sniper location and urban combat scenarios. Law enforcement agencies have similar interests.

IV. SUMMARY OF THE INVENTION

One aspect of the present invention includes a method in a computer system for tracking projectiles and localizing projectile sources comprising: obtaining infrared image data; image processing said infrared image data to reduce noise and identify streak-shaped image features; using a Kalman filter to estimate optimal projectile trajectories by, for each trajectory, determining substantial co-linearity of at least three consecutive streak-shaped image features and averaging the locations thereof to create a smoothed trajectory; determining projectile source locations by solving a combinatorial least-squares solution for all optimal projectile trajectories; and displaying said determined projectile source locations.

Another aspect of the present invention includes a method in a computer system for tracking projectiles and localizing projectile sources comprising: obtaining sequential frames of infrared image data; spatio-temporal filtering said frames of infrared image data to reduce noise; converting each of said spatio-temporal filtered images into a binary image comprising image features distinguished from a background; grouping neighboring pixels of said image features into blobs; computing blob parameters including blob centroids; filtering out blobs from the binary image based on the computed blob parameters to identify a set of streak-shaped blobs; using a Kalman filter with at least four states (x, y, vx, vy) to estimate optimal projectile trajectories from the set of streak-shaped blobs by, for each trajectory, determining substantial co-linearity of at least three consecutive streak-shaped blobs and averaging the locations of the blob centroids to create a smoothed trajectory; updating the Kalman filter using the centroids of streak-shaped blobs from new frames; determining projectile source locations by solving a combinatorial least-squares solution for all optimal projectile trajectories, calculating error ellipses derived from the least-squares fit for the projectile source locations, accepting an intersection thereof as a projectile source location if the error ellipse is small, and if the error ellipse is large choosing a different set of trajectories and continuing the determination until the error ellipse is small; and displaying said projectile source locations solved from the combinatorial leas-squares solution.

Another aspect of the present invention includes a computer system for tracking projectiles and localizing projectile sources comprising: computer processor means for obtaining infrared image data; computer processor means for image processing said infrared image data to reduce noise and identify streak-shaped image features; a Kalman filter to estimate optimal projectile trajectories by, for each trajectory, determining substantial co-linearity of at least three consecutive streak-shaped image features and averaging the locations thereof to create a smoothed trajectory; computer processor means for determining projectile source locations by solving a combinatorial least-squares solution for all optimal projectile trajectories; and a display for graphically displaying said determined projectile source locations.

Another aspect of the present invention includes a program storage device readable by a machine, tangibly embodying a program of instructions executable by the machine to perform method steps for tracking projectiles and localizing projectile sources for display on a graphics display of said machine, said method steps comprising: obtaining infrared image data; image processing said infrared image data to reduce noise and identify streak-shaped image features; using a Kalman filter to estimate optimal projectile trajectories by, for each trajectory, determining substantial co-linearity of at least three consecutive streak-shaped image features and averaging the locations thereof to create a smoothed trajectory; determining projectile source locations by solving a combinatorial least-squares solution for all optimal projectile trajectories; and displaying said determined projectile source locations on said graphics display of said machine.

V. BRIEF DESCRIPTION OF THE DRAWINGS

The accompanying drawings, which are incorporated into and form a part of the disclosure, are as follows.

VI. DETAILED DESCRIPTION

Generally, the present invention provides a passive projectile tracking and source locating system using infrared (IR) images for detecting and tracking a projectile in flight in order to reveal the source from which the projectile was fired. By processing the infrared imagery with the method described herein, the location of shooters can be located with a high degree of accuracy. Projectile source localization is used herein and in the claims to mean a determination of the location of a projectile source. Projectiles can be, for example, bullets, RPG's, mortars, etc. or any other fast moving object that are hotter than the background scene in flight. The method and system of the present invention may be implemented using commercially available off the shelf infrared sensors/detectors/cameras, computer systems, processors, monitors, and other associated electronic hardware. For example, the IR sensor used to generate the frames of raw IR image data can be, for example, a single (passive) mid-wave infrared (MWIR) sensor, or other type known in the art. Such commercially available infrared video cameras may be used to detect bullets from automatic rifles, rifles, handguns, mortars, rocket propelled grenades, and similar projectiles. In addition, it is appreciated that the present invention may be implemented as a method, or embodied as hardware in a computer system or as software in a program storage device such as a CD-ROM, hardrive, etc. for execution by a computer to perform the method of the present invention.

Figure 1:
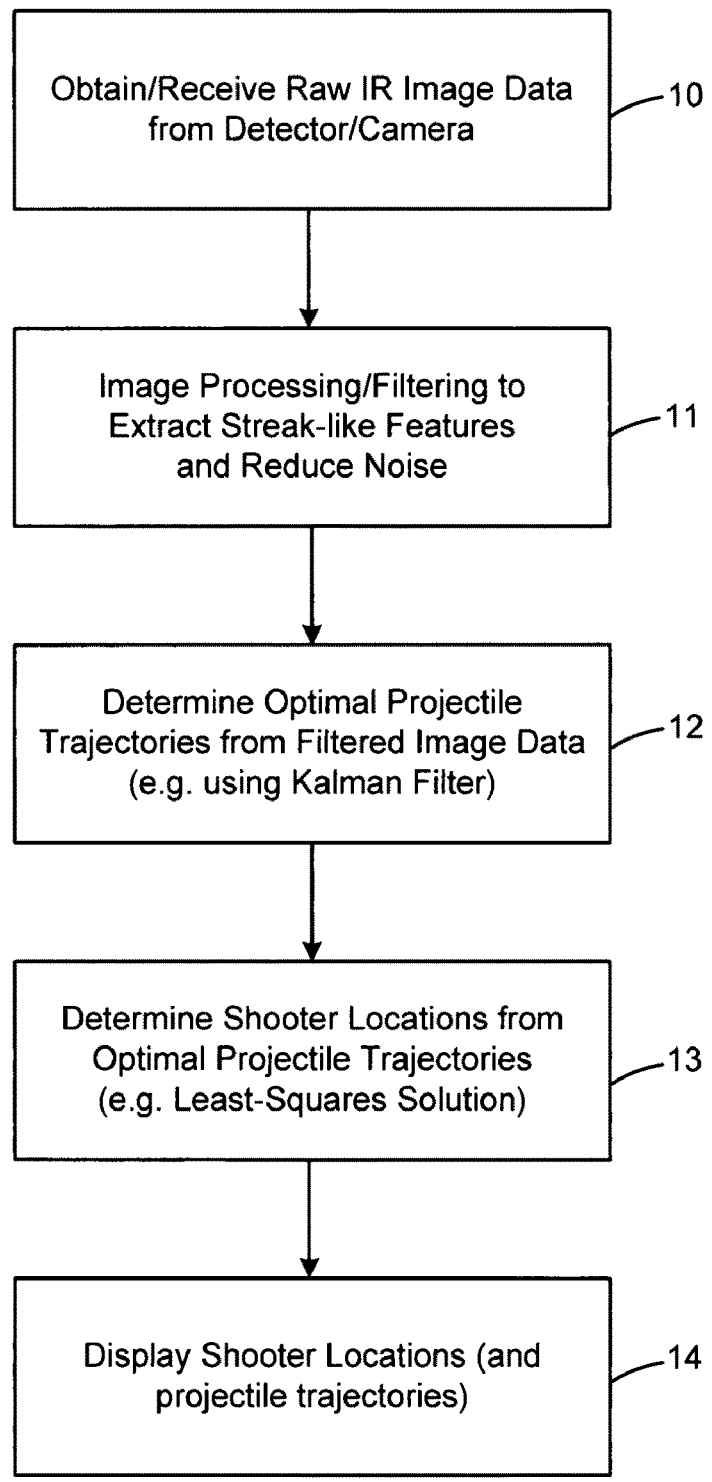
FIG. 1 is a flow diagram of the process steps of an exemplary embodiment of the method for bullet tracking and shooter localization of the present invention.
Figure 2:
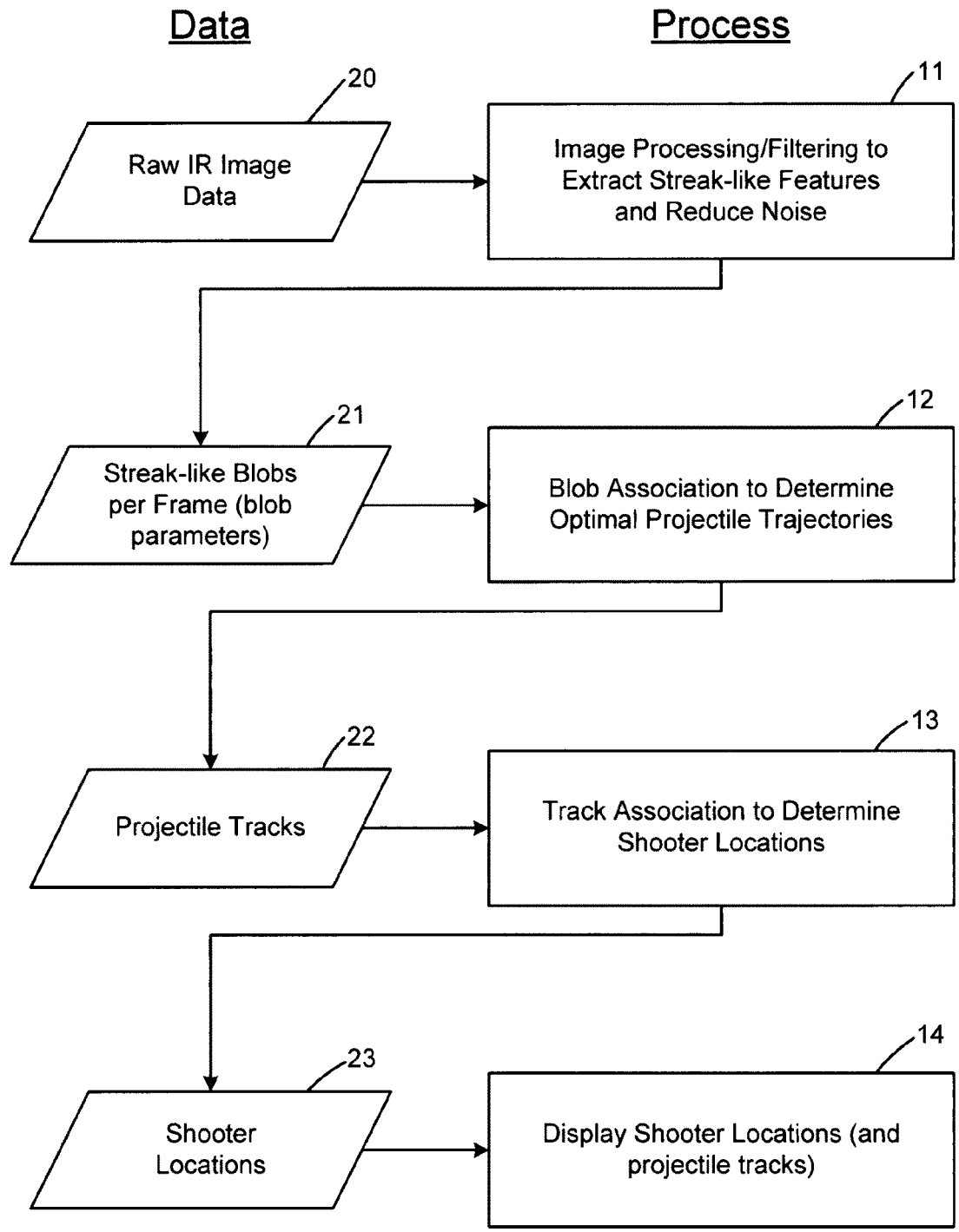
FIG. 2 is a data flow diagram of the method embodiment shown FIG. 1.

Turning now to the drawings, FIGS. 1 and 2 illustrate the general methodology of the present invention for projectile tracking and locating a shooter/source (i.e. source localization) of the present invention.

FIG. 1 is a flow chart showing the five general process steps of the method. First, raw infrared (IR) image data is received or otherwise obtained at reference character 10. Preferably the IR image data is received in real-time, such as directly from an IR sensor. It is appreciated that fast infrared cameras are presently available which can take 2D images of a rifle bullet during its trajectory. In any case, multiple, consecutive frames of IR image data is typically received for processing. Next, at 11, the raw IR image data received form the IR sensor is image processed so as to remove/reduce noise and isolate features of interest in the image for further processing. Details of this image processing/filtering step 11 is discussed in greater detail below. Next, at 12, optimal projectile trajectories are estimated from the processed/filtered IR image data, using for example a four state recursive Kalman filter, known in the art. This produces a set of optimal projectile trajectories which are associated with each other at 13 to determine all shooter locations, i.e. shooter localization. Trajectory association is accomplished by solving a least-squares solution for all projectile tracks. And finally at 14, the all shooter locations determined in the previous step are displayed, such as on a computer monitor for viewing by a user/operator. Additionally the optimal projectile trajectories may be displayed on the monitor as well.

FIG. 2 is a data flow diagram of the general method shown FIG. 1 and graphically representing the flow of data through the system for processing. In particular, FIG. 2 shows the types of data provided to and/or generated from the various process steps of FIG. 1, and is shown divided into a data column and a process column. Starting at reference character 20, raw IR image data is provided to the image processing/filtering step at 11 which performs image filtering and feature extraction on the raw image date to produce a set of streak-shaped image features (e.g. blobs) and associated image feature parameters (e.g. blob parameters). This data set is then processed at 12 where the image features, e.g. blobs, are associated with each other to determine a set of optimal projectile trajectories, indicated at 22. This data set is then passed to 13 where the trajectories are associated with each other to determine a set of shooter locations indicated at 23. And finally, the shooter locations are displayed at 14 via a graphical display such as a computer monitor.

Figure 3:
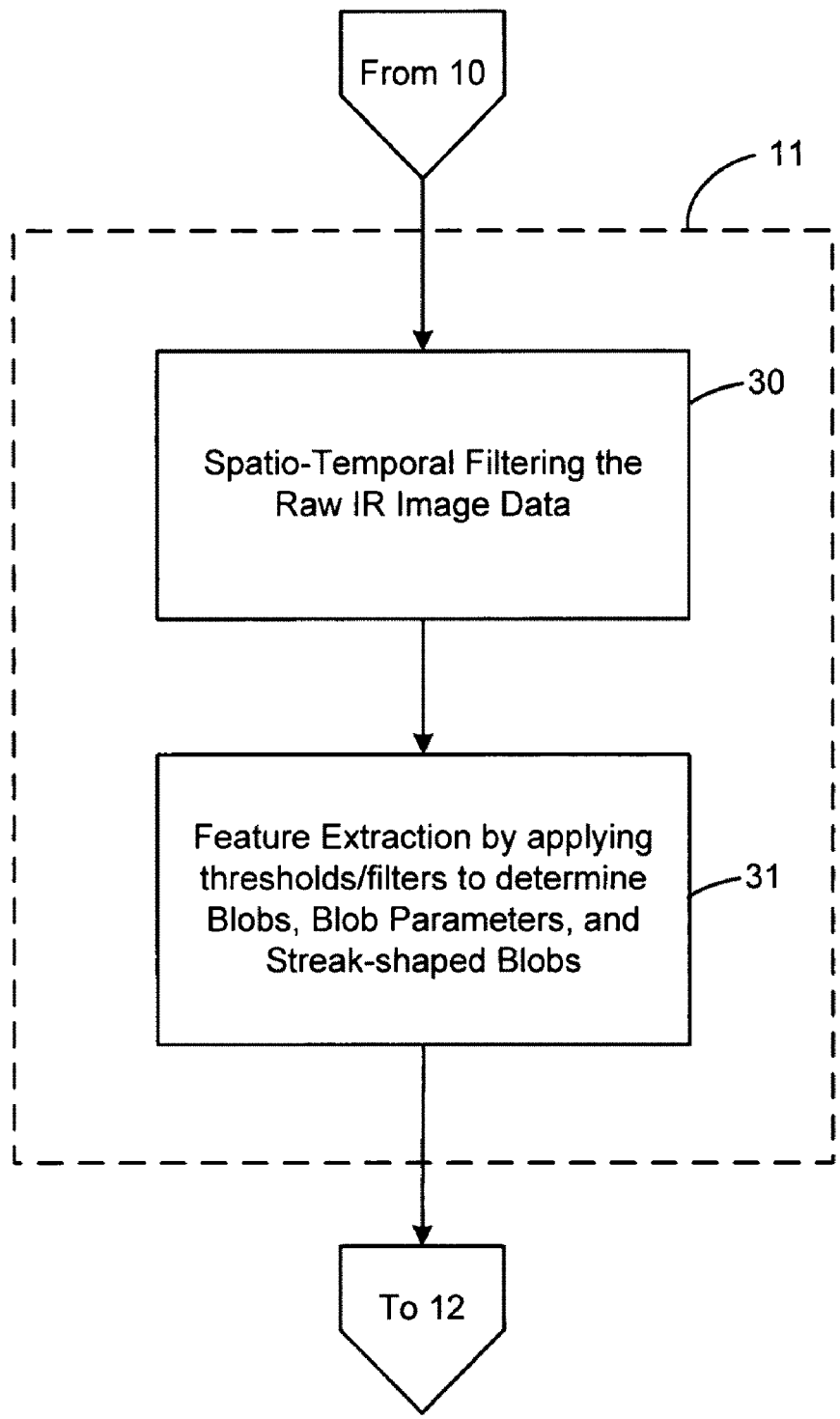
FIG. 3 is a flow diagram of exemplary subprocesses which comprise the step of image processing/filtering to extract streak-like blob features and reduce noise.

FIG. 3 is a flow diagram of exemplary subprocesses which comprise the step 11 of image processing/filtering to extract streak-like blob features and reduce noise. As shown at 30, the image processing/filtering step includes two processes including: (1) a step for spatio-temporal filtering the raw IR image data 30, for image processing the raw data to reduce noise and clutter, and a step for feature extraction 31 by applying thresholds/filters to identify blobs and blob parameters, and determine streak-shaped blobs for further processing, each of which are described next.

A. Spatio-Temporal Filtering

Figure 4:
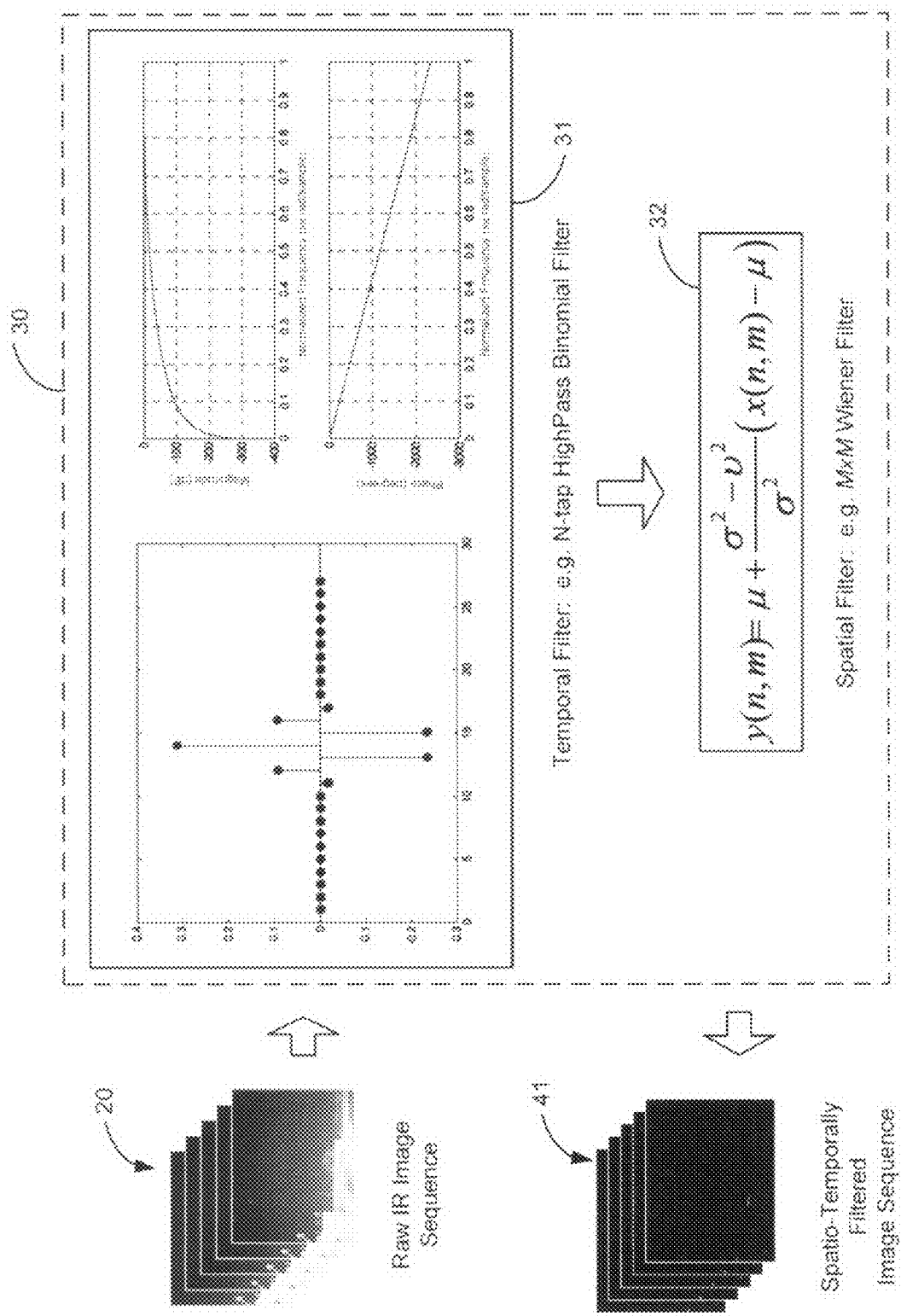
FIG. 4 is a data flow diagram illustrating data flow through an exemplary spatio-temporal filter used in the image processing/filtering step in the present invention.

FIG. 4 is a data flow diagram illustrating data flow through an exemplary spatio-temporal filter 30 used as a first part of the image processing/filtering step in the present invention. The sequence of raw IR image frames 20 received from an IR sensor are processed by the spatio-temporal filter 30 to suppress noise, and are output as a spatio-temporally filtered image sequence 41. It is appreciated that various types of signal and image processing systems may be used in the present invention to perform the real-time spatial and temporal processing of time dependent array data, e.g. sequential frames of live image data such as moving projectiles. In any case, temporal filtering in the present invention processes several frames of IR imagery to produce a single image. In particular, each input frame is weighted by a constant and the frames are added together. The weights are designed to emphasize quick transient events, while averaging out slower changes. One exemplary type of temporal filter used in the present invention is the N-tap HighPass binomial filter shown at 31, known in the art, but is not limited only to such. And spatial filtering follows the temporal filtering to further suppress noise. In particular, spatial filtering is performed one pixel at a time, with an adaptive filter of a type known in the art that adjusts the value of the pixel using global and local noise statistics. One preferred type of spatial filter used in the present invention is the M×M Wiener filter shown at 32, which is known in the art, and represented by the formula:

$$y(n, m) = \mu + \frac{\sigma^2 - v^2}{\sigma^2}(x(n, m) - \mu)$$

B. Thresholding and Feature Extraction

Figure 5:
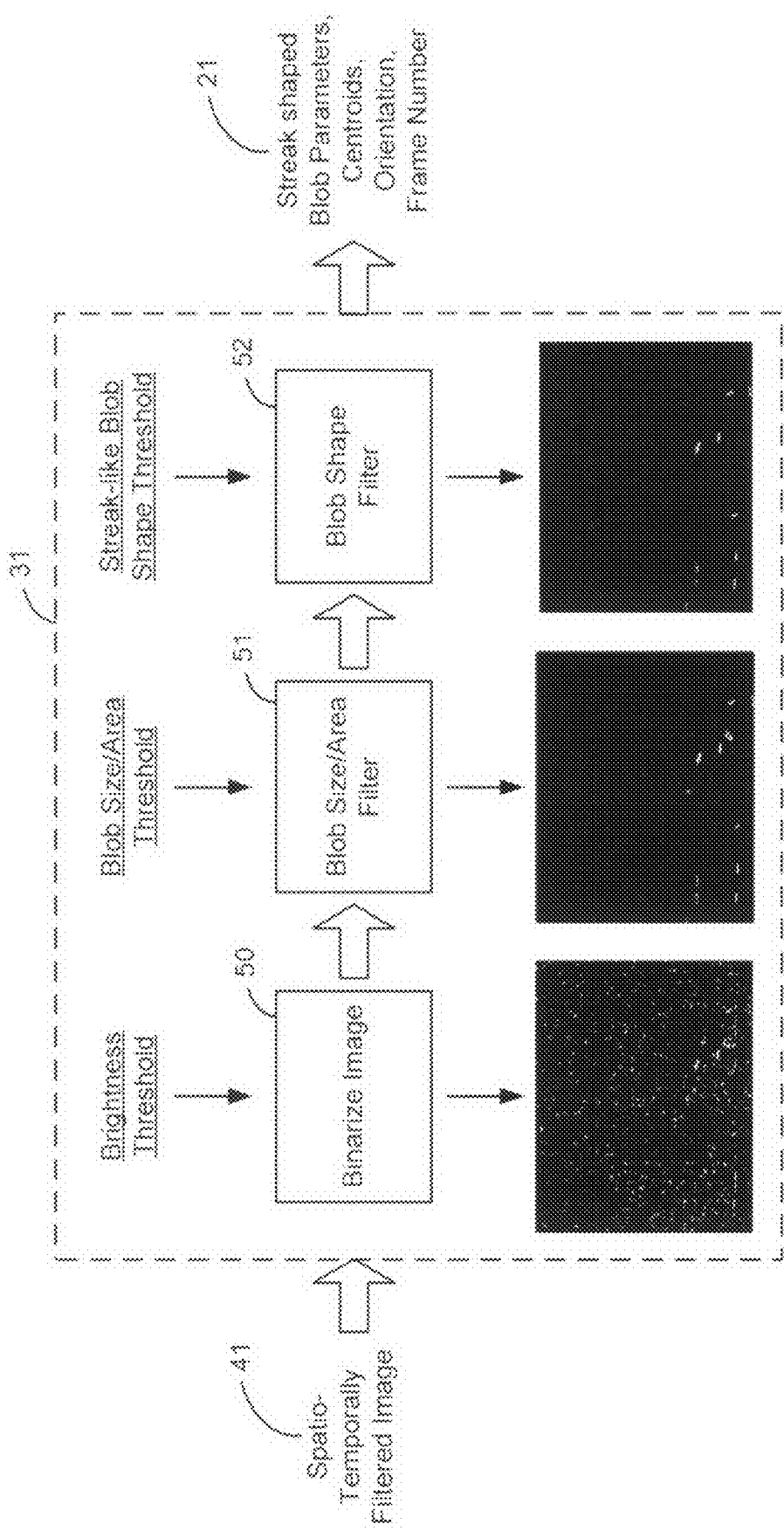
FIG. 5 is a data flow diagram illustrating data flow through an exemplary feature extraction step used in the image processing/filtering step in the present invention.

FIG. 5 is a data flow diagram illustrating data flow through an exemplary feature extraction step used in the image processing/filtering step in the present invention. The feature extraction process uses predetermined thresholds to further process the spatio-temporal filtered image, so as to identify a set of streak-shaped blobs for use in a subsequent process. First, as indicated at 50, the spatio-temporally filtered image 41 is converted into a binary image, preerably using brightness thresholds determined by the expected brightness of the bullets in the filtered image (from theoretical values and experimental data). The neighboring pixels of the image features in the binary image are grouped into units, referred to herein and in the claims as "blobs," and are assigned a label for identification. Parameters from the blobs, such as its centroid coordinates, area, and compactness (i.e. proximity of the blob to a circle) are computed. Using the calculated blob parameters, the blobs are filtered to identify all streak-shaped blobs. To this end, a blob shape filter 52 is employed to filter out blobs that do not have a streak shape. In addition, a blob size/area filter 51 may be used to filter out blobs of a certain size by applying a predetermined blob area threshold. In any case, the goal of the feature extraction process is to find all Streak-shaped Blobs, so blobs that are not streak shaped are removed from the blob list. As indicated at 21, the data set that is produced from the feature extraction process includes a set of streak-shaped blobs, blob parameters includes centroids, orientations, etc., and frame number.

C. Optimal Trajectory Estimation by Blob Data Association

The streak-shaped blobs, along with blob parameters such as centroid, orientation, compactness, etc., determined in the previous process are further used in a blob-association process to identify projectile trajectories. In this regard, a four state (x, y, vx, vy) Kalman filter (known in the art) is preferably used to estimate a bullet's trajectory. It is appreciated that a Kalman filter is a recursive filter that estimates the state of a dynamic system from a series of incomplete and noisy measurements which contain random errors. The Kalman filter models a bullet's trajectory (in the image plane) and averages the locations of the bullet observations (i.e. blob centroids) to create a smooth trajectory. As part of the filter computations, the variance and covariance (i.e. a measure of errors) associated with the state vector (x, y, vx, vy) are produced. It is appreciated that instead of a constant velocity Kalman filter used and described here, a constant acceleration Kalman filter model could be used in the alternative that would model acceleration (either true acceleration or apparent acceleration due to camera perspective). In that case, bullets are in FOV for limited number of frames so that few updates are possible. And because this is a higher-order model, it takes longer to settle.

The centroids of blobs calculated from the image process/filtration step may be used to update the Kalman filter. In this regard, nearest neighbor algorithm (known in the art) is preferably used to update the Kalman filter with bullet observations (i.e. blob centroids) from new frames. The size of the neighborhood, (about which to accept a bullet observation update), is a function of the filter's covariance terms. The nearest neighbor method is preferably used under the following conditions: use Kalman filter predicted state at t=k+1, gate about predicted state, increase gate for a particular established track when update for that track is missing. It is appreciated, however, that other models could be used as an alternative to the nearest neighbor method, e.g. least-squares curve fits of X(t) & Y(t), etc.

Three conditions are required for track initialization. First, three consecutive data points (i.e. blob centroids) are required. The xy coordinates used for the three data points are designated as follows: first data point (point$_0$) has coordinates (x(k), y(k)), the second data point (point$_1$) has coordinates, (x(k−1), y(k−1)), and the third data point (point$_2$) has coordinates, (x(k−2), y(k−2)). Secondly, the three data points must be substantially co-linear. The substantial co-linearity of consecutive data points is preferably determined using only angle conditions between data points (e.g. blob centroids). It is appreciated, however, that other methods for determining consecutiveness of data points may be used in the alternative, such as translational criteria. For example, the angular difference between the line of point$_1$/point$_2$ and the line of point$_0$/point$_1$ may be required to be less than four degrees:

$$\theta_{12} - \theta_{01} < 4°, \text{ where } \theta_{12} = \tan^{-1}\left(\frac{y(k-1) - y(k-2)}{x(k-1) - x(k-2)}\right),$$

$$\theta_{01} = \tan^{-1}\left(\frac{y(k) - y(k-1)}{x(k) - x(k-1)}\right)$$

And third, the blob orientations must be substantially aligned with the trajectory. For example, substantial alignment is preferably defined by the following:

$$\theta_{02} = \tan^{-1}\left(\frac{y(k) - y(k-2)}{x(k) - x(k-2)}\right),$$

$$\theta_{orientation} = f(\text{orientation of blob}),$$

$$\theta_{02} - \theta_{orientation} < 20°$$

In the case of track continuation w/updates:

$$H = \begin{bmatrix} 1 & 0 & 0 & 0 \\ 0 & 1 & 0 & 0 \end{bmatrix},$$

linearized measurement matrix state vector=[x y $V_x$ $V_y$], constant acceleration Kalman filter And in the case of track continuation w/o updates:

state vector=[x y $V_x$ $V_y$], constant acceleration Kalman filter

Tracks are also preferably deleted upon three consecutive missing updates.

D. Shooter Localization by Trajectory Association

After optimal projectile trajectories are determined, the tracks are associated ("track association") with each other to determine, i.e. estimate, shooter locations. It is appreciated that the only data set available from which source locations may be determined, is the set of projectile trajectories (approximately straight lines) on an XY-plane determined from the previous process. Thus the present invention only utilizes 2D geometry. In particular, shooter locations are determined by solving a combinatorial least-squares solution for all bullet tracks, which is essentially taking a set of tracks (i.e. straight lines on the xy plane) and determining how well they intersect at a single point. Error ellipses derived from the least-squares fit are calculated for the shooter locations. If the error ellipse is small, the intersection is accepted. If the error ellipse is large, then a different set of tracks is chosen and the process continues until the error ellipse is small. The accepted intersection is the determined shooter location.

There is, however, a limit imposed on track association by the number of simultaneous combinations that can be searched over. For example, assume that there are N tracks. It would be ideal to evaluate all combinations of tracks to find the sources, starting at the deepest level, k=N, and working up to the shallowest level, k=1, where, any track that belongs to a deeper-level source cannot also belong to a shallower-level source.

$$\text{Number of combinations} = \prod_{r=1}^{r=k} (n+1-r),$$

where $n = N$, $k$ = depth level

However, because there is a restriction by the depth level with respect to the CPU time required to find a solution, an arbitrary limit must therefore be set on the number of tracks to simultaneously consider when testing for sources. As a practical compromise to depth-level limit, it is preferable to limit depth level to a reasonable value, e.g. k=6. Find all sub-optimal track combinations that meet some criteria. It is notable that optimal sources would be found by allowing the depth level to extend to k=N. Combine all sub-optimal track combinations, that are now made up of up to k-tuple tracks, into track combinations that can be made up of up to N-tuple tracks by applying a "post-combining metric." This is roughly analogous to breaking an N-dimensional state vector into m smaller state vectors, performing an operation on them, and then sub-optimally recombining them. A k-tuple track combination can only be appended to a larger-tuple track combination once Grouping metrics of k-tuple tracks and appended N-tuple tracks is as follows.

For k-tuple Metrics, it is assumed that we are solving for the intersection of k straight lines. Therefore, for each track, determine if |mY|<|mX|. If yes, then y=mY·x+bY. Or else, x=mX·y+bX. This is the least-squares solution of intersection (bX or bY) of track with CCD edges based on sign of slope and quadrant (mX or mY). In least-squares form:

$$\vec{Z} = M \cdot \vec{U} + \vec{D},\ M = f(m_x, m_y),\ \vec{U} = f(x, y),\ \vec{D} = f(b_x, b_y)$$

$$\vec{U}^* = (M^T M)^{-1} M^T \cdot (\vec{Z} - \vec{D})$$

$$\vec{Z}^* = M \cdot \vec{U}^* + \vec{D}$$

Z* (or M) will contain between 2-to-k track IDs. For co-source combination metric:

$$\sigma(Z^*) < \epsilon_{Track\ spatial}$$

$$\text{Source\_}k = f(k^* \text{indeces})$$

If this condition is satisfied, then these 2-to-k track IDs will be stored to represent a Source location by backtracking from [U*, mean(Z*)].

For appended k-tuple Metrics, at this point there exists a Source_k matrix, where each row contains several columns:

Source_k(row_n)=[Source1 trackID1 trackID2 . . . trackIDk $U^*$mean($Z^*$) . . . ]

A new matrix, Source appended, can be created by searching over each row of the Source_k matrix for trackID vectors that may be combined into larger vectors, provided that they have similar [U*mean(Z*)]:

$$\|[U^* \text{mean}(Z^*)]_{row\_i} - [U^* \text{mean}(Z^*)]_{row\_j}\| < \epsilon_{Source spatial}$$

E. EXAMPLES

Figure 6:
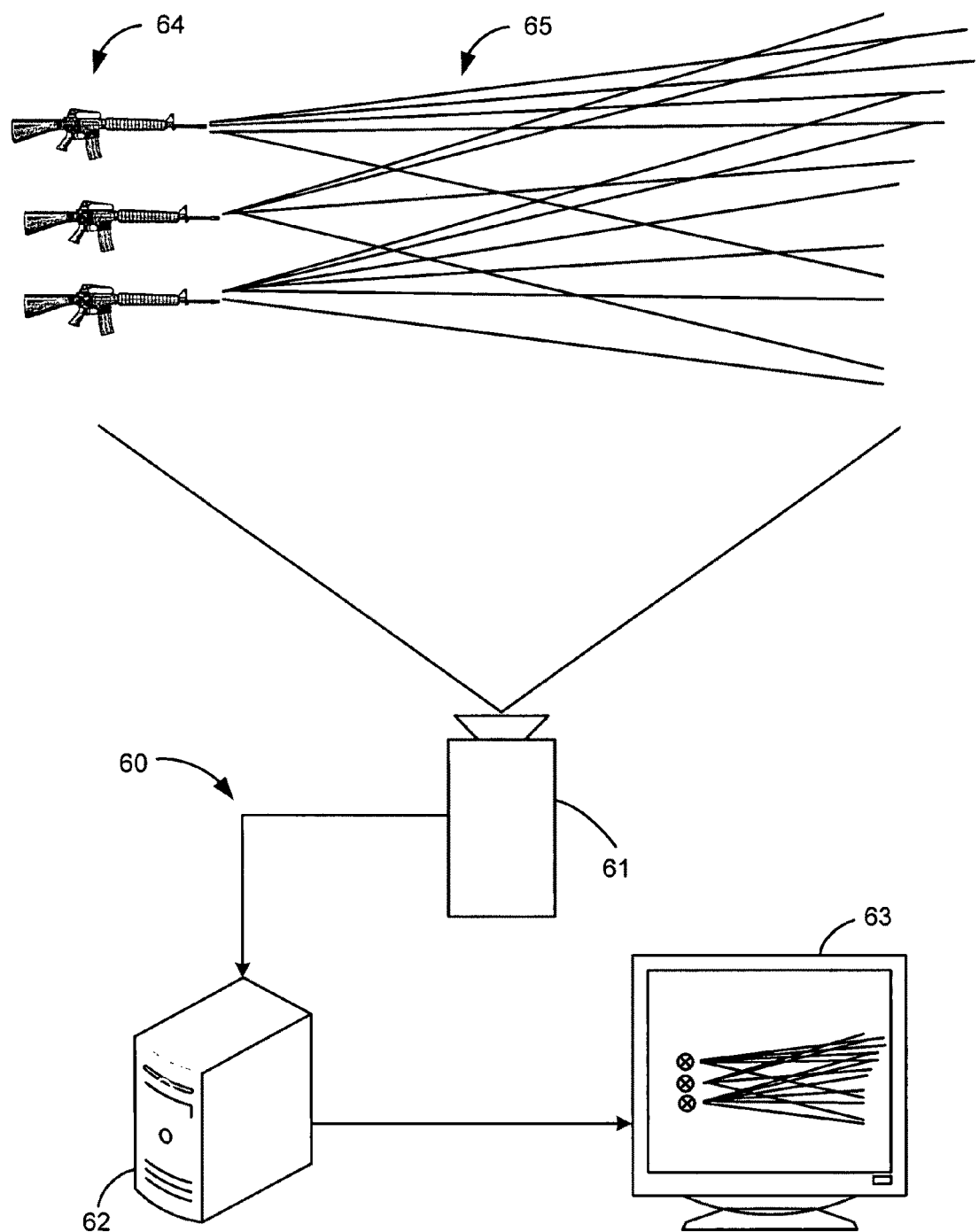
FIG. 6 is a schematic layout of the system of the present invention for projectile detection, tracking, and shooter localization, and illustrating its substantially orthogonal vantage point with respect to projectile trajectories.

FIG. 6 is a schematic layout of the computerized system of the present invention for projectile detection, tracking, and shooter localization, and illustrating its substantially orthogonal vantage point with respect to projectile trajectories. The system includes a computer processor 62 embodiment all of the computer processes described in the present invention connected to a monitor 63. An infrared sensor 61 is connected to the computer processor 62, and aimed at an projectile area having multiple projectile sources, represented by guns 64 shooting bullets in a substantially orthogonal direction to the viewing angle, so that the projectile trajectories 64 are also substantially orthogonal. As can be seen in the monitor, the three shooter locations are graphically represented revealing their locations in the xy plane.

Figure 7:
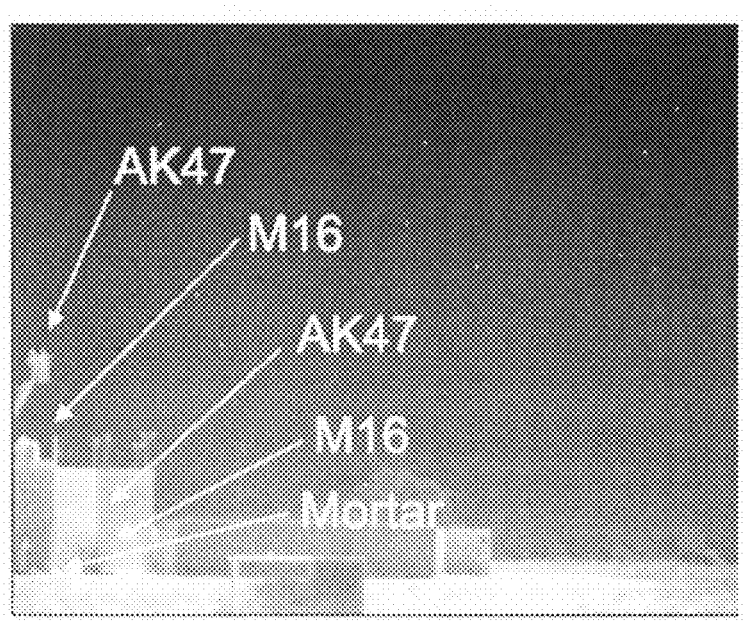
FIG. 7 is a sample image of a test site at a range of about 200 meters and indicating actual shooter locations.
Figure 8:
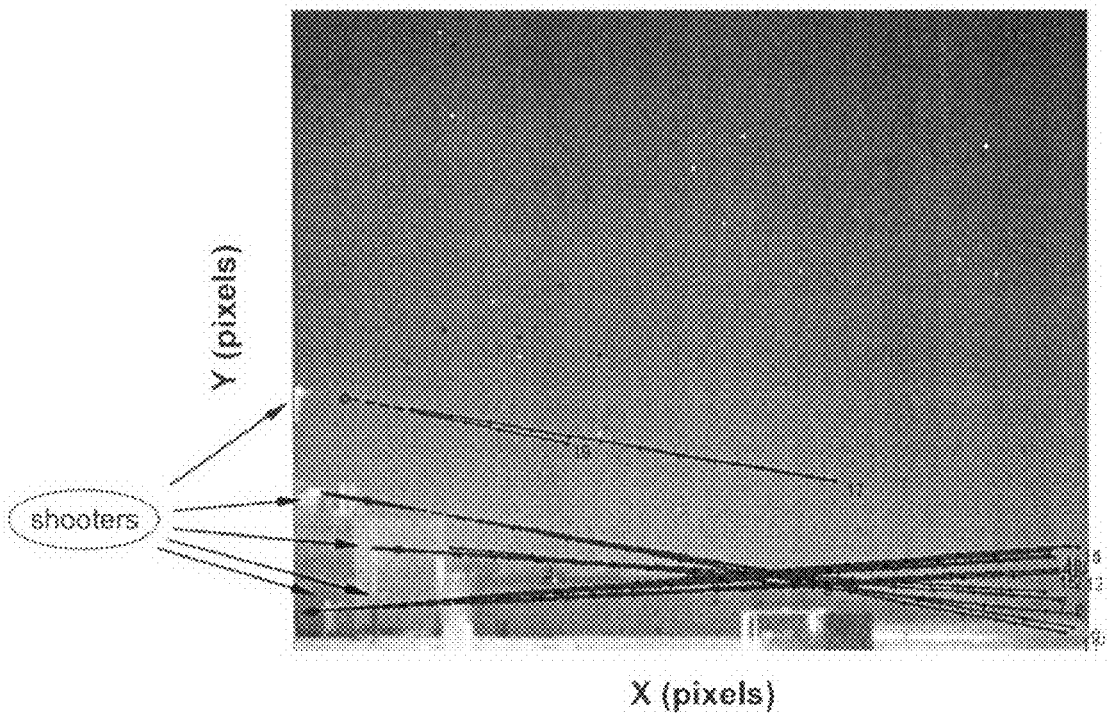
FIG. 8 is a sample display output generated by the method and system of the present invention using IR images taken from a range of about 400 meters of the test site of FIG. 6, and revealing projectile trajectories and shooter locations.

And FIG. 7 is a sample image of a test site at a range of about 200 meters and indicating actual shooter locations. And FIG. 8 is a sample display output generated by the method and system of the present invention using IR images taken from a range of about 400 meters of the test site of FIG. 7, and revealing projectile trajectories and shooter locations.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. A method in a computer system for tracking projectiles and localizing projectile sources comprising:

obtaining sequential frames of infrared image data;

image processing said frames of infrared image data to reduce noise and identify streak-shaped image features;

using a Kalman filter with at least four states $(x, y, V_x, V_y)$ to estimate optimal projectile trajectories by, for each trajectory, determining substantial co-linearity of at least three consecutive streak-shaped image features and averaging the locations thereof to create a smoothed trajectory;

determining projectile source locations by solving a combinatorial least-squares solution for all optimal projectile trajectories; and displaying said determined projectile source locations.

2. The method of claim 1, wherein said step of image processing said frames of infrared image data includes a step of spatio-temporal filtering said frames of infrared image data to reduce noise.

3. The method of claim 2, wherein in the temporal filtering part of the spatio-temporal filtering step said frames of infrared image data are each weighted by a constant and the frames are added together.

4. The method of claim 3, wherein the temporal filter is an N-tap highpass binomial filter.

5. The method of claim 2, wherein the spatial filtering part of the spatio-temporal filtering step adjusts the value of each pixel using global and local noise statistics.

6. The method of claim 5, wherein the spatial filter is an M×M Wiener filter.

7. The method of claim 2, wherein said step of image processing further includes a step of extracting image features from the spatio-temporal filtered image.

8. The method of claim 7, wherein the step of extracting image features from the spatio-temporal filtered image includes converting the spatio-temporal filtered image into a binary image using a brightness threshold based on predetermined brightness values of the projectiles so that image features are distinguished from a background.

9. The method of claim 8, wherein the step of extracting image features from the spatio-temporal filtered image further includes grouping neighboring pixels of the image features of the binary image into blobs, computing at least one blob parameter selected from the group consisting of centroid coordinates, area, and compactness of the blobs, and identifying a set of streak-shaped blobs based on the computed blob parameter(s).

10. The method of claim 9, wherein the Kalman filter is filter used for estimating optimal projectile trajectories from the set of streak-shaped blobs of the binary image by, for each trajectory, determining substantial co-linearity of at least three consecutive streak-shaped blobs and averaging the centroid locations thereof to create a smooth trajectory.

11. The method of claim 10, further comprising the step of updating the Kalman filter using streak-shaped blob centroids obtained from new frames.

12. The method of claim 11, wherein a nearest neighbor algorithm is used to update the Kalman filter, with the size of the neighborhood about which to accept a streak-shaped blob update being a function of the Kalman filter's covariance terms.

13. The method of claim 11, wherein the step of updating the Kalman filter includes deleting a projectile trajectory upon at least three consecutive missing updates.

14. The method of claim 1, wherein the step of determining projectile source locations includes the steps of calculating error ellipses derived from the least-squares fit for the projectile source locations, accepting an intersection thereof as a projectile source location if the error ellipse is small, and if the error ellipse is large choosing a different set of trajectories and continuing the determination until the error ellipse is small.

15. A method in a computer system for tracking projectiles and localizing projectile sources comprising:

obtaining sequential frames of infrared image data;

spatio-temporal filtering said frames of infrared image data to reduce noise;

converting each of said spatio-temporal filtered images into a binary image comprising image features distinguished from a background;

grouping neighboring pixels of said image features into blobs;

computing blob parameters including blob centroids;

filtering out blobs from the binary image based on the computed blob parameters to identify a set of streak-shaped blobs;

using a Kalman filter with at least four states $(x, y, V_x, V_y)$ to estimate optimal projectile trajectories from the set of streak-shaped blobs by, for each trajectory, determining substantial co-linearity of at least three consecutive streak-shaped blobs and averaging the locations of the blob centroids to create a smoothed trajectory;

updating the Kalman filter using the centroids of streak-shaped blobs from new frames;

determining projectile source locations by solving a combinatorial least-squares solution for all optimal projectile trajectories, calculating error ellipses derived from the least-squares fit for the projectile source locations, accepting an intersection thereof as a projectile source location if the error ellipse is small, and if the error ellipse is large choosing a different set of trajectories and continuing the determination until the error ellipse is small; and displaying said projectile source locations solved from the combinatorial leas-squares solution.

16. A computer system for tracking projectiles and localizing projectile sources comprising:

computer processor means for obtaining sequential frames of infrared image data;

computer processor means for image processing said frames of infrared image data to reduce noise and identify streak-shaped image features;

a Kalman filter with at least four states $(x, y, V_x, V_y)$ to estimate optimal projectile trajectories by, for each trajectory, determining substantial co-linearity of at least three consecutive streak-shaped image features and averaging the locations thereof to create a smoothed trajectory;

computer processor means for determining projectile source locations by solving a combinatorial least-squares solution for all optimal projectile trajectories; and a display for graphically displaying said determined projectile source locations.

17. The computer system of claim 16,
wherein said computer processor means for image processing said frames of infrared image data includes a spatio-temporal filter to reduce noise.

18. The computer system of claim 17,
wherein the temporal filter of the spatio-temporal filter weights each frame of infrared image data by a constant and adds the frames together.

19. The computer system of claim 18,
wherein the temporal filter is an N-tap highpass binomial filter.

20. The computer system of claim 17,
wherein the spatial filter of the spatio-temporal filtering step adjusts the value of each pixel using global and local noise statistics.

21. The computer system of claim 20,
wherein the spatial filter is an M×M Wiener filter.

22. The computer system of claim 17,
wherein said computer processor means for image processing further includes processor means for extracting image features from the spatio-temporal filtered image.

23. The computer system of claim 22,
wherein said processor means for extracting image features from the spatio-temporal filtered image includes processor means for converting the spatio-temporal filtered image into a binary image using a brightness threshold based on predetermined brightness values of the projectiles so that image features are distinguished from a background.

24. The computer system of claim 23,
wherein said processor means for extracting image features from the spatio-temporal filtered image further includes processor means for grouping neighboring pixels of the image features of the binary image into blobs, computing at least one blob parameter selected from the group consisting of centroid coordinates, area, and compactness of the blobs, and identifying a set of streak-shaped blobs based on the computed blob parameter(s).

25. The computer system of claim 24,
wherein the Kalman filter is used for estimating optimal projectile trajectories from the set of streak-shaped blobs of the binary image by, for each trajectory, determining substantial co-linearity of at least three consecutive streak-shaped blobs and averaging the centroid locations thereof to create a smooth trajectory.

26. The computer system of claim 25,
further comprising processor means for updating the Kalman filter using streak-shaped blob centroids obtained from new frames.

27. The computer system of claim 26,
wherein the processor means for updating the Kalman filter is a nearest neighbor processor, with the size of the neighborhood about which to accept a streak-shaped blob update being a function of the Kalman filter's covariance terms.

28. The computer system of claim 26,
wherein the processor means for updating the Kalman filter deletes a projectile trajectory upon at least three consecutive missing updates.

29. The computer system of claim 16,
wherein said computer processor means for determining projectile source locations calculates error ellipses derived from the least-squares fit for the projectile source locations, accepts an intersection thereof as a projectile source location if the error ellipse is small, and if the error ellipse is large choosing a different set of trajectories and continues the determination until the error ellipse is small.

30. A program storage device readable by a machine, tangibly embodying a program of instructions executable by the machine to perform method steps for tracking projectiles and localizing projectile sources for display on a graphics display of said machine, said method steps comprising:

obtaining sequential frames of infrared image data;

image processing said frames of infrared image data to reduce noise and identify streak-shaped image features;

using a Kalman filter with at least four states $(x, y, V_x, V_y)$ to estimate optimal projectile trajectories by, for each trajectory, determining substantial co-linearity of at least three consecutive streak-shaped image features and averaging the locations thereof to create a smoothed trajectory;

determining projectile source locations by solving a combinatorial least-squares solution for all optimal projectile trajectories; and displaying said determined projectile source locations on said graphics display of said machine.

* * * * *